(12) United States Patent
Code et al.

(10) Patent No.: US 11,915,332 B2
(45) Date of Patent: Feb. 27, 2024

(54) SYSTEM AND PROCESS FOR TOKENIZATION AND MANAGEMENT OF LIABILITY

(71) Applicant: LOYYAL CORPORATION, New York, NY (US)

(72) Inventors: Shannon Code, Raleigh, NC (US); Sean Dennis, Earnley (GB); Gregory Simon, Beaufort, NC (US)

(73) Assignee: Loyyal Holdings Incorporated, Dubai (AE)

(*) Notice: Subject to any disclaimer, the term of this patent is extended or adjusted under 35 U.S.C. 154(b) by 449 days.

(21) Appl. No.: 15/284,457

(22) Filed: Oct. 3, 2016

(65) Prior Publication Data

US 2017/0098291 A1 Apr. 6, 2017

Related U.S. Application Data

(60) Provisional application No. 62/236,241, filed on Oct. 2, 2015.

(51) Int. Cl.
*G06Q 50/18* (2012.01)
*G06Q 40/02* (2023.01)

(52) U.S. Cl.
CPC ........... *G06Q 50/188* (2013.01); *G06Q 40/02* (2013.01)

(58) Field of Classification Search
CPC combination set(s) only.
See application file for complete search history.

(56) References Cited

U.S. PATENT DOCUMENTS

| | | | |
|---|---|---|---|
| 8,639,568 B2 | 1/2014 | De Boer et al. | |
| 8,935,314 B2 * | 1/2015 | Ravichandran | G06Q 30/0251 709/202 |
| 9,641,342 B2 | 5/2017 | Sriram et al. | |
| 10,275,772 B2 * | 4/2019 | Ronca | G06Q 20/065 |
| 10,340,038 B2 * | 7/2019 | Witchey | H04W 12/02 |
| 10,482,538 B1 * | 11/2019 | White | G06Q 40/08 |
| 2002/0107731 A1 | 8/2002 | Teng | |

(Continued)

FOREIGN PATENT DOCUMENTS

| | | |
|---|---|---|
| KR | 20070020770 A | 2/2007 |
| WO | WO-2013059794 A1 | 4/2013 |
| WO | WO-2015085393 A1 | 6/2015 |

OTHER PUBLICATIONS

Mopals, https://fwww.mopals.com/how-it-works.
Mopals, https://fwww.mopals.com/how-to-earn.
Money Mind Games, Digital currency reworks traditional notions of cash, plastic, http://www.cspnet.com/sites/default/files/magazine-files/1312-F6_DigitalCurrency_0.pdf.

(Continued)

*Primary Examiner* — Chrystina E Zelaskiewicz
(74) *Attorney, Agent, or Firm* — Goodwin Procter LLP (57) ABSTRACT

A system and process for management of liabilities is disclosed. The embodiments mitigate variance in the assessment of liability values. In an exemplary embodiment, a liability may be created under rules stored in the form of an digital token. The rules may form a smart contract wherein the terms within the contract change automatically based on criteria being met. The token associated with the smart contract may have tangible value that can appreciate/depreciate and may thus be a tradeable asset or commodity. The inventory of liabilities associated with an issuer may thus be tracked and value precisely assessed.

20 Claims, 3 Drawing Sheets

(56) References Cited

U.S. PATENT DOCUMENTS

| | | | |
|---|---|---|---|
| 2008/0209400 A1* | 8/2008 | Parker | H04L 41/5045 |
| | | | 717/122 |
| 2008/0209555 A1* | 8/2008 | Parker | G06F 8/65 |
| | | | 726/22 |
| 2008/0243623 A1 | 10/2008 | Redford et al. | |
| 2010/0063892 A1* | 3/2010 | Keronen | G06Q 30/04 |
| | | | 705/26.1 |
| 2012/0259698 A1 | 10/2012 | Yurow | |
| 2013/0246221 A1† | 9/2013 | Denton et al. | |
| 2013/0311266 A1 | 11/2013 | Vichich et al. | |
| 2013/0311348 A1 | 11/2013 | Samid | |
| 2014/0141869 A1 | 5/2014 | Shore | |
| 2014/0164251 A1 | 6/2014 | Loh | |
| 2015/0294308 A1 | 10/2015 | Pauker et al. | |
| 2015/0302400 A1 | 10/2015 | Metral | |
| 2015/0332256 A1 | 11/2015 | Minor | |
| 2015/0332283 A1* | 11/2015 | Witchey | G16H 10/60 |
| | | | 705/3 |
| 2016/0098730 A1 | 4/2016 | Feeney | |
| 2017/0032365 A1* | 2/2017 | Liberty | G06Q 20/10 |

OTHER PUBLICATIONS

Nakamoto, "Bitcoin: A Peer-to-Peer Electronic Cash System", pp. 1-9.

TAGcoin, http://tagcoin.org/.

Building Gift Cards 2.0 on the Block Chain, https://medium.com/@giyom/building-gift-cards-2-0-on-the-block-chain-3ae9e7cf4152, published Jun. 15, 2015.

International Search Report for Application No. PCT/US15/40020 dated Dec. 7, 2015.

Office Action for Canadian Application No. 2,954,655 dated Nov. 8, 2017.

Written Opinion for Singapore Application No. 11201700142P dated Sep. 4, 2017.

Office Action for Korean Patent Application No. 10-2017-7003878 dated Nov. 1, 2017.

Written Opinion and Search Report for Singapore Application No. 10201900951Y dated Dec. 8, 2022.

Office Action Examination Report for United Arab Emirates, Application No. P6000021/2017, dated Jun. 28, 2022.

\* cited by examiner

† cited by third party

SYSTEM AND PROCESS FOR TOKENIZATION AND MANAGEMENT OF LIABILITY

CROSS-REFERENCE TO RELATED APPLICATION

This application claims benefit under 35 U.S.C. § 119(e) of U.S. Provisional Applications having Ser. No. 62/236,241 filed Oct. 2, 2015, which is hereby incorporated by reference herein in its entirety.

FIELD

The subject disclosure relates to digital file management, and more particularly to a system and process for tokenization of liability and management thereof.

BACKGROUND

The term "liability" as used herein refers to the obligation of one party to another in the performance of an agreement. Liability management is currently performed through the use of actuarial assumption tables. These tables estimate future redemption probabilities. These estimates are quantified and applied to the reported liability on for example, financial statements such as a balance sheet. This method relies upon subjective estimates (typically at the direction of a person) which can often be wrong. In some applications, for example redemption programs, the current approaches result in variance risk, which is the difference between the estimated liability redemption and the actual liability redemption. Redemption variance may result in an unexpected financial loss to the reporting entity. Thus it may be difficult and inefficient for the issuer to make changes to reported estimated financial liability when a redemption variance occurs.

Moreover, liability agreements are typically static. The ability to change an agreement usually requires the consent of both parties, which may necessitate redrafting written documents. If an agreement is modifiable within predetermined timelines, the ability to modify multiple liability agreements is generally unfeasible by a person needing to review the liability of each agreement and changing terms as needed. In systems using computer aided liabilities, the ability of liabilities to be used in rapidly executed transactions is stymied by the fact that each transaction needs to be manually evaluated for the change in liability. Systems that use computer aided tracking of liability agreements still use human input to record changes. Thus, conventional approaches still suffer from the need for a person to physically redraft agreements because of the modified terms. Of course, the value of a modified liability also changes, the tracking of which is difficult to assess one agreement at a time. Thus, even conventional computer aided systems for managing the digital files associated with liability management suffer from much of the same deficiencies as manually managed approaches using pen and paper.

As can be seen, there is a need for a system and process that can provide liability management, the value for each of which can be tracked and modified by parties automatically as needed.

SUMMARY

In one aspect of the disclosure, a system for tokenization and management of liability comprises a computer readable medium including: a digital token comprising a set of stored rules stored related to a liability, the set of rules including terms of a contract between an issuer and a creditor, and a hash function tracking changes to the terms of the contract; and a host server configured to update the status of the digital token within an electronic distributed ledger in response to detected changes in the terms of the contract tracked by the hash function, the host server including a set of instructions to reassess a value associated with the liability in response to the detected changes in the terms of the contract and broadcast an update of the digital token to the electronic distributed ledger.

In another aspect of the disclosure, a method for generating a tangible digital asset through tokenization and management of liability comprises generating a digital token comprising a set of stored rules stored related to a liability associated with the digital token, the set of rules including terms of a contract between an issuer and a creditor; identifying, by a computer processor, an update to a status of one of the terms of the contract; modifying, by the computer processor, the terms of the contract in the digital token in response to the updated status of one of the terms of the contract; modifying by the computer processor, the value of the liability associated with the digital token in response to the updated status of one of the terms of the contract; and broadcasting by a host server, to an electronic distributed ledger, the modified terms of the contract in the digital token and the modified value of the liability associated with the digital token.

In still yet another aspect of the disclosure a computer program product for hosting an online portal for the tokenization and management of liability, comprises a non-transitory computer readable storage medium having computer readable program code embodied therewith, the computer readable program code being configured to: generate a digital token comprising a set of stored rules stored related to a liability associated with the digital token, the set of rules including terms of a contract between an issuer and a creditor; identify, by the computer processor, an update to a status of one of the terms of the contract; modify, by the computer processor, the terms of the contract in the digital token in response to the updated status of one of the terms of the contract; modify by the computer processor, the value of the liability associated with the digital token in response to the updated status of one of the terms of the contract; and broadcast by a host server, to an electronic distributed ledger, the modified terms of the contract in the digital token and the modified value of the liability associated with the digital token.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

Generally, embodiments of the subject technology provide a system and process for management of liabilities and in some embodiments, a specific solution mitigating variance in the assessment of liability values. Embodiments disclosed below generally exist within an electronic online environment. In an exemplary embodiment, a liability may be created under rules stored in the form of a digital token. A digital token maybe a string of bytes entered into an electronic ledger. In an exemplary embodiment, the digital token includes computer executable instructions that change the string of bytes from one state to another upon a condition in the instructions being fulfilled (for example, using a script to track criteria and modify the instructions in response to changes in the criteria). The rules may form a contract (sometimes referred to as a "smart contract" because of the ability of the terms within the contract to change automatically based on criteria being met) which is represented by the token. In exemplary applications, the token may have tangible value that can appreciate/depreciate and may thus be a tradeable asset or commodity. The token and its contents may be configured to remain static or self-modify based on criteria within the rules being met.

It will be appreciated that aspects of the subject technology improve the fields of digital file management and more particularly digital asset tracking. For example, an embodiment of the subject technology provides a system for improved management of financial liability. The issuer of a liability, such as a reward liability (for example in a redemption program), can use the token to manage reported financial liability redemption variance risk, incentivize accelerated liability redemption velocity, and dynamically change liability redemption value based on the bearer's identity, past financial and non-financial behavior, etc. These attributes may be tracked by inspecting the state of performance within the token's contract terms that can be measured for performance and status changes within the criteria. As the criteria changes within the data of the digital token in response to performance status changes, the instructions within the token automatically adjust the rules of the contract without the need for a person to review the data for performance and modify the agreement for each occurrence. As may be appreciated, this exemplary feature can dynamically change the value of the token and its liability rapidly so that transactions may occur on demand in an electronic environment. Aspects of the subject technology may be used for example to manage issued financial liabilities, such as liabilities resulting from the issuance of customer loyalty incentives such as rewards, coupons, gift-cards, etc. and/or the operation of that customer loyalty incentive program. In an online environment, several occurrences of a triggering event may occur every minute, for example, which can quickly affect the criteria involved and the value of the liability. However, the digital token including a smart contract disclosed herein goes well beyond the routine step of stopping for each event, which may affect the value of the liability for review of terms. Aspects disclosed herein manage the effect of events on terms which affect the liability by using processes and a host server running the processes to automatically adjust the contents of the token and ensure integrity in the system by broadcasting the updated token through an electronic public ledger.

Figure 1:
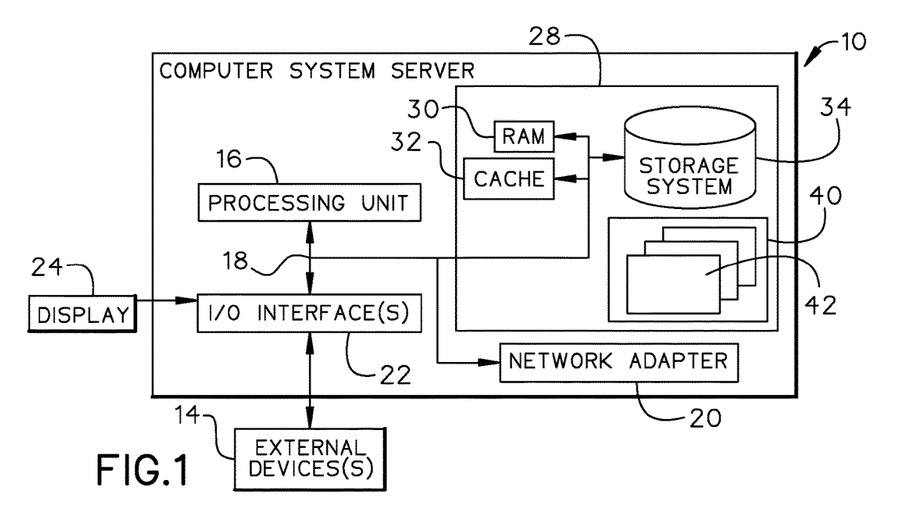
FIG. 1 is a block diagram of a computer/server system for processing and managing liabilities in accordance with an aspect of the subject technology.

Referring now to FIG. 1, a schematic of an example of a computer system/server 10 is shown. The computer system/server 10 is shown in the form of a general-purpose computing device. As may be appreciated, reference to a computer system/server 10 (sometimes referred to as a "general computing machine") in the following description may refer to different machines depending on the role or function being performed. In addition, more than one computer system/server 10 may be present simultaneously, for example in the network 100 described more fully below. The computer system/server 10 may serve the role as the machine implementing for example functions related to receiving and storing contract terms, generating a token associated with a contract, performing contract terms, updating contract terms, tracking changes in a contract, tracking a number of times a contract in a token has been fulfilled, assessing a value for the token, and generating a token value based on the terms of a token's contract. The components of the computer system/server 10 may include, but are not limited to, one or more processors or processing units 16, a system memory 28, and a bus 18 that couples various system components including the system memory 28 to the processor 16.

The computer system/server 10 may be for example, personal computer systems, tablet devices, mobile telephone devices, server computer systems, handheld or laptop devices, multiprocessor systems, microprocessor-based systems, set top boxes, programmable consumer electronics, network PCs, and distributed cloud computing environments that include any of the above systems or devices, and the like. The computer system/server 10 may be described in the general context of computer system executable instructions, such as program modules, being executed by a computer system (described for example, below). In some embodiments, the computer system/server 10 may be a cloud computing node connected to a cloud computing network (not shown). The computer system/server 10 may be practiced in distributed cloud computing environments where tasks are performed by remote processing devices that are linked through a communications network. In a distributed cloud computing environment, program modules may be located in both local and remote computer system storage media including memory storage devices.

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown). The system memory 28 may include at least one program product 40 having a set (e.g., at least one) of program modules 42 that are configured to carry out the functions of embodiments of the invention. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 2:
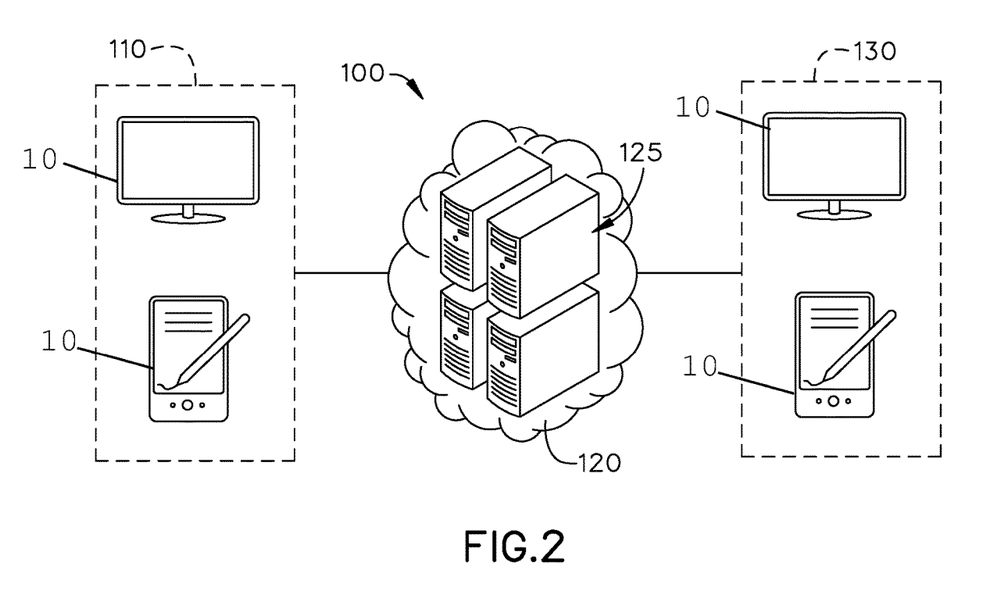
FIG. 2 is a block diagram of a network processing and managing liabilities in accordance with an aspect of the subject technology.

The system 100 generally includes a first party 110, a second party 130, and a network 120. The first and second parties 110; 130 may represent for example an issuer and a creditor within a liability agreement that agree to the formation of a smart contract being tokenized. The network 120 may include a server(s) 125 storing a software embodiment of the disclosed invention and acting as an intermediary or host providing the distributed ledger and blockchain environment for implementing transactions within the system. The first party 110 and second party 130 may interact with the system 100 through respective general computing machines 10. The server(s) 125 likewise may function for example, under the description of the general computing machine 10. Either the first party 110 and/or the second party 130 may create the terms of the smart contract which may be assembled and tokenized within the server(s) 125. Changes to the token (or to the contract within the token) may be read, detected, and updated within the server(s) 125. In an exemplary embodiment, changes to the token may be tracked using a hash function (described further below) stored and updated within the server(s) 125.

Figure 3:
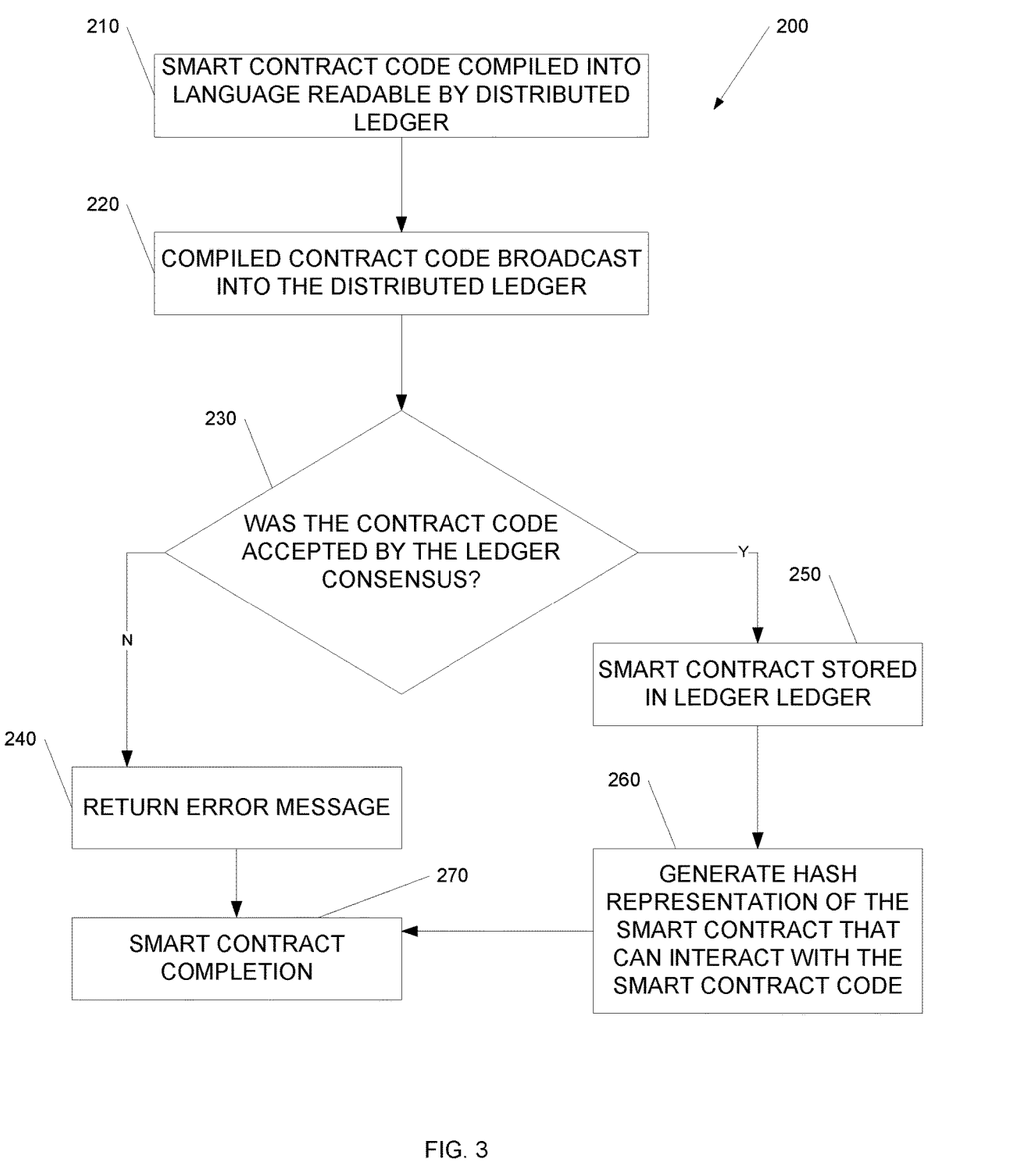
FIG. 3 is a flowchart of a method of creating a contract for use in a system and process of managing liabilities in accordance with an aspect of the subject technology.
Figure 4:
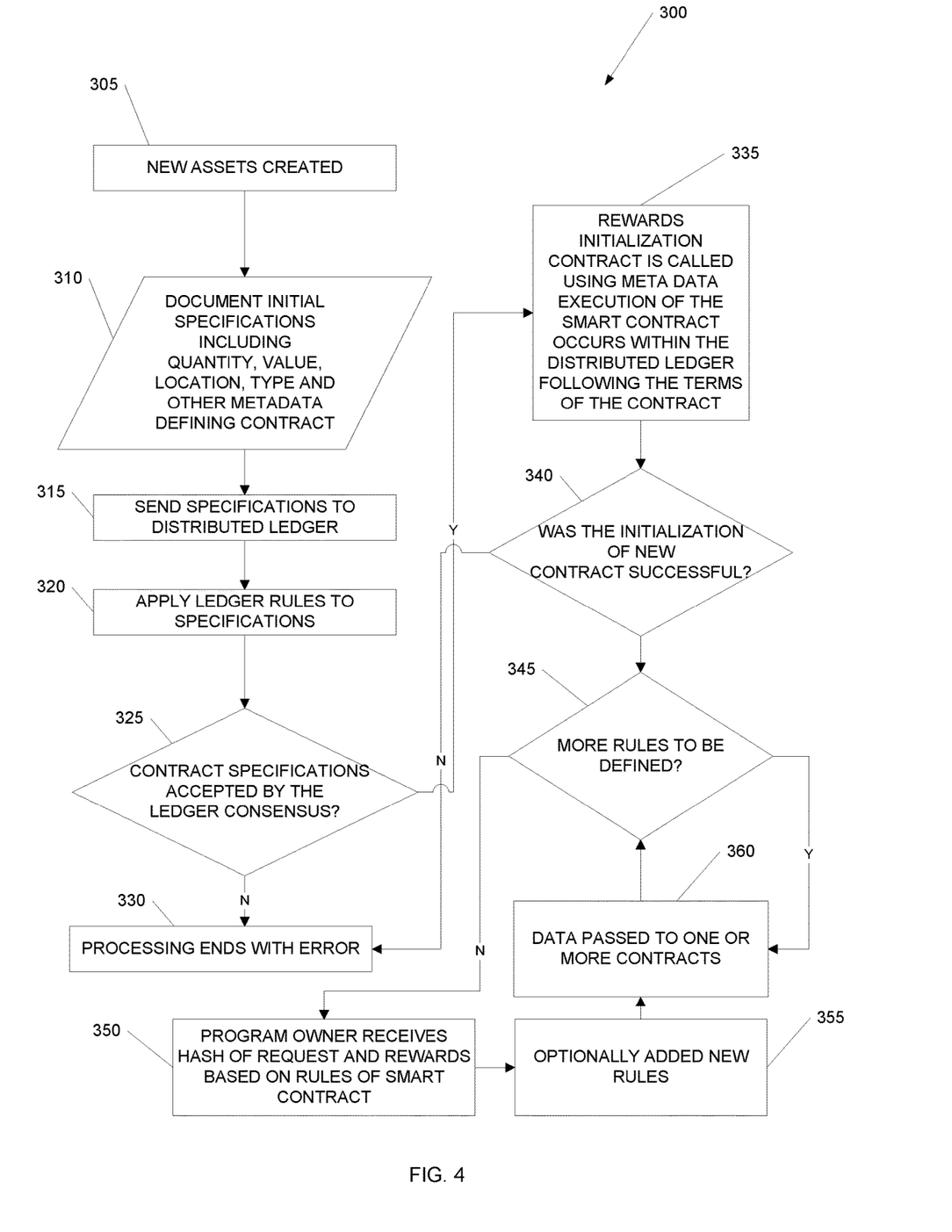
FIG. 4 is a flowchart of managing a liability within an exemplary application in accordance with an aspect of the subject technology.

Referring now to FIGS. 3 and 4, a process 200 for creating a tokenized smart contract and a process 300 for the management of a liability is shown in the context of a redemption program. The process 200 for creation of the smart contract may be a sub-step of the process 300 for managing a liability, and thus a number of the process steps may be intertwined in the description below.

In general, a liability may be embodied (305) into a digital tangible and trackable asset by defining (310) rules (specifications) associated with the liability which when executed, may modify a value(s) associated with liability. In one exemplary embodiment, the liability and its pre-defined rules may be assembled into a digital token. An example of a digital token pseudocode follows:

```
"Token Model (definition) {
Name: _____
Divisible to ___ units
Creator: _______
Owner: _______
Balances: Array(agent,balance)
Created Date: _______
Expiry Date: _______
Associated Rules: array(rules)
function getBalance( )
function transferOwnership( )
}
```

The above pseudocode is an example of a token model. For individual "tokens" one or more parties cryptographically "sign" the unique contract after fields have been filled in and the resulting code is converted to "hexadecimal"

This provides a "signed" transaction in electronic form which can be immediately (or at a later date) "broadcast" into the network. A reference to this unique token can be known ahead of time or may be provided by the network after submission and acceptance.

Events trigger actions on a token. Events can happen within the network or triggered by some external mechanism (API call, system call). Events may trigger for example, a change in the properties of a token, adjustment in value, a transfer in ownership, an assignment of new properties, an addition or adjustment of new owners, and/or an addition, removal or adjustment of rules. Events may destroy tokens as well. The parts of a token that are allowed to be modified or interacted with may be specified at the tokens creation. The token may also restrict modifications, preventing the owner and/or creator from adjusting all or some properties of the token.

The tokenization of a liability may be tied to a tangible counterpart via some identifier (a serial number or lot number for example). The inception of a tokenized liability (which can be a single indivisible unit, multiple indivisible units, single divisible units or a group of divisible units) takes place by explicitly designing the creation rules in the form of a smart contract linked to a specific liability on, for example, a balance sheet. These rules (the smart contract) are specially formulated pieces of software that define the rules of the tokenized representation of the liability. Rules can define how the tokenized liability as an asset comes into existence, how it's disposed of, how it is tracked across space and time or any number of simple or complex rules. These rules may be designed in a way that can be reusable by other tokenized liabilities. In some embodiment, changes to the rules may be built-in for automatic modification over the history of the token or its evolution. In other embodiments, the rules may be static or open-ended for change at a later date.

A smart contract (software designed rule) is pushed (315) (or sent) into the network, which may use a distributed ledger protocol, based upon rules specified (320) (or applied) by the particular ledger being used and sometimes incur cost. Contracts thereafter may be enforced in a distributed and decentralized manner based on the consensus rules agreed upon in the ledger of choice.

Rules for a smart contract may be defined tightly or loosely to allow for very specific or intentionally vague (to be dealt with in some other contract of rule) sets of rules. Generally the rules are coded and compiled (210) into a language understood by the host system, for example a system using a distributed ledger. A contract may then be broadcast (220) into the ledger for acceptance (230) and (325) by the ledger consensus. If consensus is not reached, an error message may be returned (240) and (330). After acceptance, a rewards initialization may be called (335) using meta data execution of the smart contract. The host server may determine whether the initialization is successful (340). After a contract or group of contracts (rules) have been persisted across the network, they can be utilized to tokenize a liability. A smart contract itself may not necessarily be a representation of the liability but may be simply the rules defining how the particular token representing the liability will behave. Once the contract is tokenized, a file history associated with the contract may be generated. If accepted, the contract is stored (250) and history related to the contract is tracked. In some embodiments, the smart contract may be complete (270) and (340). The contracts are utilized in the tokenization and use of tokenized liabilities by sending (350) instructions from a contract defining how a user (or a program owner) can interact with liabilities along with small payment as specified by the particular ledger being used. In response to initialization being accepted within the network, the host server may determine (345) whether the smart contract needs more rules defined. In some embodiments, new rules may be added (355) at the request of the program owner. New rules added to the smart contract may be passed (360) to one or more other contracts in the ledger or other media. Rules such as triggers, meta data used to track activity and ownership may be added based on the rules specified.

In some embodiments, a hash function (which may be for example, a 32 bit string) is generated (260) in association with the token and the contents therein. The hash function may update changes to the elements of the contract (for example, number of times the contract terms are executed and fulfilled, number of times a term is modified, number of times a value appreciates/depreciates within the terms (for example based on the number of fulfillments, etc.). Updated elements of the token may be broadcast to the ledger for reconciliation. The issuer of the liability can utilize audit tools to track the state of their liabilities (as related to multiple tokens) and the historic properties of those across time and space (any type of data the contracts are designed to persist.

The tokenized liability may be considered a historic, cryptographically provable and immutable group of events that have taken place across the network, which may or may not be a distributed ledger protocol, based upon the rules governing the consensus of the network and the contracts used to create and track behavior of the tokenized liability. The sequential and immutable event log of a tokenized liability throughout these contracts coalesce into the current state of the tokenized liability. This is then communicated back the actual liability reported in the financial statements. A tokenized liability issuance contract might define a method to update the rules of an actual reported liability in the future.

Many contracts can coexist on a network, which may or may not be a distributed ledger protocol, and may or may not be partitioned to prohibit or allow use by other contracts within the network. Contracts and therefore tokenized liabilities as assets, tokens, rewards, assets may interact with or be influenced by other networks, which may or may not be distributed ledger protocols, allowing value and the tokenized liability to potentially move from one network to another.

Aspects of the smart contract and its rules may build in other features that may invoke functions from other devices within a general computing device 10. For example, a rule may be built-in that periodically pings a GPS device or beacon (which may be for example, another element on the device 10 not shown in FIG. 1) detecting whether a user is in proximity to a physical location such as a business. Another rule may offer bonus points, rewards, or discounts based on the frequency of patronizing a business or an incentive for patronizing a business. Actions thereafter by the user may trigger another rule that affects the value of the token's liability which are updated within the aforementioned hash function and the ledger.

As may be appreciated, the embodiments disclosed eliminate variance risk within for example, financial systems by adjusting the financial liability value of a liability based on the actuarial redemption assumptions built in to the rules. At any point in time the reported financial liability and the actual outstanding financial liability for the issuer may be the same value. Thus the issuer of a financial liability has greater control over the redemption value of the financial liability. Aspects of the subject technology allow dynamic and/or customized redemption commands to incentivize the bearer of the issuer's financial liability to redeem it with the issuer. Precise real-time inventory and tracking of the identity of the bearers of the issuer's financial liability may be achieved. In addition, the issuer's financial liability is provided an avenue to be exchanged or transferred securely between itself and another party or between other parties Those of skill in the art would appreciate that various components and blocks may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. For example, while the foregoing was described in the context of a rewards or redemption program and associated liabilities, it will be understood that other applications may use aspects of the subject technology to track information and assess changing value as provided by the system and processes disclosed.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system, comprising:
    a non-transitory computer readable medium including:
        a digital token comprising a set of stored rules related to a liability, the set of rules including terms of a contract between an issuer and a creditor and actuarial redemption assumptions built into the set of rules, wherein the digital token includes computer executable instructions, which are implemented in a blockchain environment, and
        a hash function tracking changes in the terms of the contract;
    a computer processor that performs:
        generating the digital token;
        generating the hash function associated with the digital token;
        identifying an update to a status of one of the terms of the contract tracked by the hash function;
        modifying the terms of the contract in the digital token based on the updated status of one of the terms of the contract tracked by the hash function in the blockchain environment;
        modifying elements associated with the liability of the digital token based on the actuarial redemption assumptions in response to the updated status of one of the terms of the contract in the blockchain environment; and;
    a host server that provides tokenization and management of the liability in the blockchain environment, to an electronic distributed ledger, and broadcasts the modified terms of the contract in the digital token and the modified elements associated with the liability of the digital token in the blockchain environment.

2. The system of claim 1, wherein the set of stored rules in the digital token trigger the host server to change the terms in the contract in response to criteria in the set of rules being met.

3. The system of claim 1, wherein the detected changes in the terms of the contract are based on a state of performance of one or more terms of the contract.

4. The system of claim 3, wherein the updated elements of the digital token associated with the liability is based on the state of performance of one or more terms of the contract.

5. The system of claim 1, wherein the updated elements of the digital token associated with the liability may appreciate and depreciate.

6. A method, comprising:
    generating a digital token comprising a set of stored rules related to a liability associated with the digital token, the set of rules including terms of a contract between an issuer and a creditor and actuarial redemption assumptions built into the set of rules, wherein the digital token includes computer executable instructions, which are implemented in a blockchain environment;
    generating a hash function associated with the digital token, the hash function tracking changes to statuses of terms of the contract;
    identifying, by a computer processor, an update to a status of one of the terms of the contract tracked by the hash function;

modifying, by the computer processor, the terms of the contract in the digital token based on the updated status of one of the terms of the contract tracked by the hash function in the blockchain environment;

modifying by the computer processor, elements associated with the liability of the digital token based on the actuarial redemption assumptions in response to the updated status of one of the terms of the contract in the blockchain environment; and broadcasting by a host server that provides tokenization and management of the liability in the blockchain environment, to an electronic distributed ledger, the modified terms of the contract in the digital token and the modified elements associated with the liability of the digital token in the blockchain environment.

7. The method of claim 6, wherein the hash function tracks the number of times contract terms are fulfilled and the number of times the elements associated with the liability associated with the digital token appreciates and depreciates based on the number of times the contract terms are fulfilled.

8. The method of claim 6, further comprising changing the terms in the contract in response to criteria in the set of rules being met.

9. The method of claim 6, wherein the elements associated with the liability may appreciate and depreciate.

10. The method of claim 6, further comprising adding new rules related to the liability in response to the updated status of one of the terms of the contract.

11. A computer program product for hosting an online portal for tokenization and management of liability in a blockchain environment, the computer program product comprising a non-transitory computer readable storage medium having computer readable program code embodied therewith, the computer readable program code when executed by a computer processor causes the computer processor to:

generate a digital token comprising a set of stored rules related to a liability associated with the digital token, the set of rules including terms of a contract between an issuer and a creditor and actuarial redemption assumptions built into the set of rules, wherein the digital token includes computer executable instructions, which are implemented in the blockchain environment;

generate a hash function associated with the digital token, the hash function tracking changes to statuses of terms of the contract;

identify, by the computer processor, an update to a status of one of the terms of the contract tracked by the hash function;

modify, by the computer processor, the terms of the contract in the digital token based on the updated status of one of the terms of the contract tracked by the hash function in the blockchain environment;

modify by the computer processor, elements associated with the liability of the digital token based on the actuarial redemption assumptions in response to the updated status of one of the terms of the contract in the blockchain environment; and cause a host server that provides tokenization and management of the liability to broadcast, to an electronic distributed ledger, the modified terms of the contract in the digital token and the modified elements associated with the liability associated with the digital token in the blockchain environment.

12. The computer program product of claim 11, wherein the hash function tracks the number of times contract terms are fulfilled and the number of times the elements associated with the liability associated with the digital token appreciates and depreciates based on the number of times the contract terms are fulfilled.

13. The computer program product of claim 11, further comprising changing the terms in the contract in response to criteria in the set of rules being met.

14. The computer program product of claim 11, wherein the elements associated with the liability may appreciate and depreciate.

15. The computer program product of claim 11, further comprising adding new rules related to the liability in response to the updated status of one of the terms of the contract.

16. The system of claim 1, wherein the digital token is generated by:

filling in information for one or more fields in a pseudo-code;

receiving a cryptographical signature from one or more parties associated with the contract; and converting the pseudocode with the cryptographical signature into a hexadecimal.

17. The system of claim 1, wherein the updated elements of the digital token are broadcasted to the electronic distributed ledger by using a distributed ledger protocol.

18. The system of claim 1, wherein the digital token further comprises a script that tracks criteria in the set of rules and modifies the computer executable instructions in response to a change associated with the criteria, so that the set of stored rules related to the liability are adjusted.

19. The system of claim 1, wherein the set of stored rules included in the digital token define how the digital token representing the liability behaves in response to the tracked changes.

20. The system of claim 1, wherein the set of stored rules included in the digital token comprises a built-in rule that periodically pings a GPS device or beacon for detecting whether a user is in proximity to a physical location, and another rule that updates a value of the digital token based on pinging information.

* * * * *